United States Patent
Jangid et al.

(10) Patent No.: US 11,950,180 B2
(45) Date of Patent: Apr. 2, 2024

(54) METHOD AND SYSTEM FOR CAMPING A UE IN 4G AND 5G OVERLAPPING AREA

(71) Applicant: SAMSUNG ELECTRONICS CO., LTD., Suwon-si (KR)

(72) Inventors: Alok Kumar Jangid, Karnataka (IN); Kailash Kumar Jha, Karnataka (IN); Aman Agarwal, Karnataka (IN); Avneesh Tiwari, Karnataka (IN); Ravi Pandappa Kamaladinni, Karnataka (IN); Samiran Bhowmik, Karnataka (IN); Abhishek Kaswan, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 404 days.

(21) Appl. No.: 17/507,051

(22) Filed: Oct. 21, 2021

(65) Prior Publication Data
US 2022/0046524 A1  Feb. 10, 2022

Related U.S. Application Data

(63) Continuation of application No. PCT/KR2021/006127, filed on May 17, 2021.

(30) Foreign Application Priority Data

May 18, 2020 (IN) .............................. 202041020936
Apr. 21, 2021 (IN) .............................. 202041020936

(51) Int. Cl.
*H04W 8/04* (2009.01)
*H04W 48/16* (2009.01)
(Continued)

(52) U.S. Cl.
CPC ............ *H04W 48/16* (2013.01); *H04W 48/18* (2013.01); *H04W 48/20* (2013.01); *H04W 84/042* (2013.01)

(58) Field of Classification Search
CPC ......... H04W 8/04; H04W 40/24; H04W 8/18; H04W 12/64
See application file for complete search history.

(56) References Cited

U.S. PATENT DOCUMENTS

| | | | |
|---|---|---|---|
| 8,885,565 B2 | 11/2014 | van de Ven et al. | |
| 2014/0066055 A1* | 3/2014 | Balakrishnan | H04W 36/14 455/432.1 |

(Continued)

FOREIGN PATENT DOCUMENTS

WO  2019/075717  4/2019

OTHER PUBLICATIONS

"A RAN Based Solution for the 5G Indicator", Vodafone, R2-2002660, 3GPP TSG-RAN WG2 Meeting #109bis-e, sections 3.1-3.2, Apr. 8, 2020, 15 pages.

(Continued)

*Primary Examiner* — Tu X Nguyen
(74) *Attorney, Agent, or Firm* — Nixon & Vanderhye, P.C.

(57) ABSTRACT

Various embodiments herein disclose a method camping a User Equipment (UE) on a cell, the method comprising: creating a combined Most Recently Used (MRU) list by merging a list 4G MRU frequencies with a Public Land Mobile Network (PLMN) having a 5GC and a list of 5G MRU frequencies, determining whether one of a 4G cell with 5G core (5GC) and a 5G cell is available for camping by performing a MRU scan on the combined MRU list; performing one of: camping on one of the 4G cell with 5G core and the 5G cell in response to determining that one of (Continued)

the 5G cell and the 4G cell with 5G core is available and performing a 4G MRU frequency scan on a list of 4G without 5GC MRU frequencies in response to determining that one of the 4G cell with 5G core and the 5G cell is not available.

15 Claims, 13 Drawing Sheets

(51) Int. Cl.
*H04W 48/18* (2009.01)
*H04W 48/20* (2009.01)
*H04W 84/04* (2009.01)

(56) References Cited

U.S. PATENT DOCUMENTS

| | | |
|---|---|---|
| 2016/0095156 A1 | 3/2016 | Mitra et al. |
| 2016/0345246 A1 | 11/2016 | Xing et al. |
| 2017/0332224 A1 | 11/2017 | Han et al. |
| 2018/0049108 A1* | 2/2018 | Yang .................. H04L 47/2475 |
| 2018/0152872 A1 | 5/2018 | Wirtanen et al. |
| 2020/0077325 A1 | 3/2020 | Jangid et al. |
| 2020/0236612 A1 | 7/2020 | Hong |

OTHER PUBLICATIONS

International Search Report for PCT/KR2021/006127 dated Sep. 1, 2021, 3 pages.
Extended European Search Report dated Aug. 18, 2023 issued in European Patent Application No. 21809624.6.
3GPP TSG-RAN, "Discussion on SSB periodicity addition in SIB", Meeting Notes, Meeting #106, May 13-17, 2019, 4 pages.

* cited by examiner

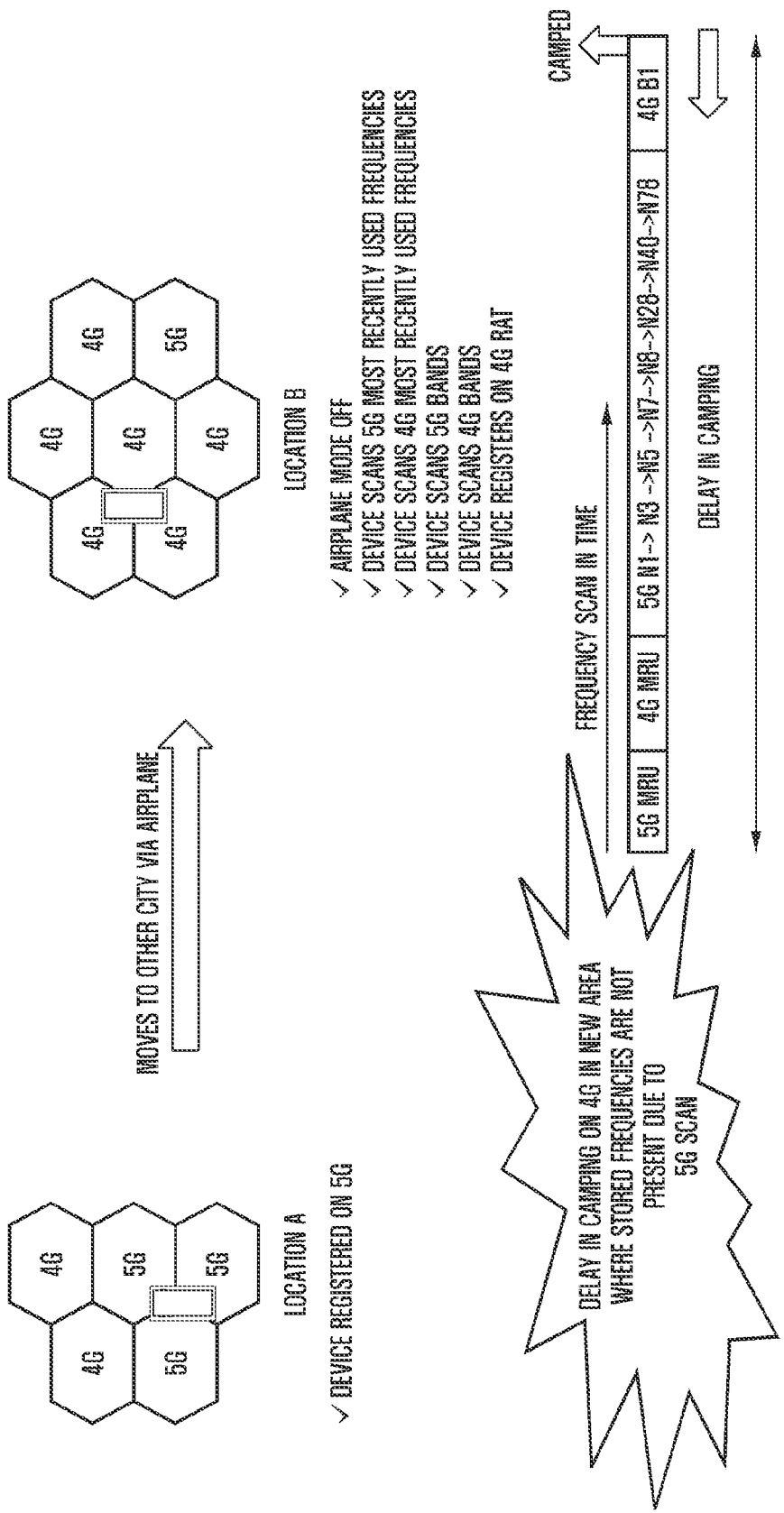

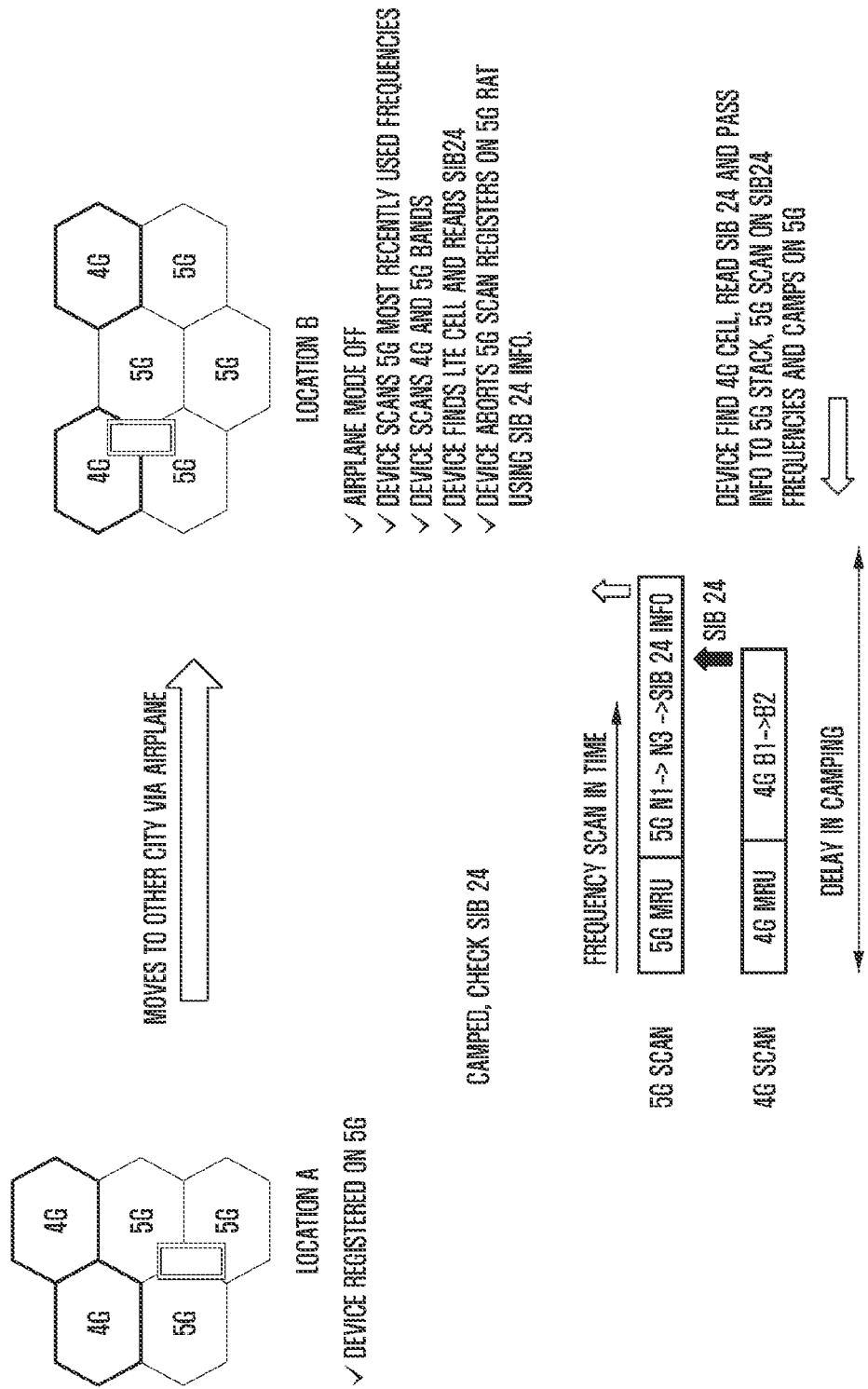

METHOD AND SYSTEM FOR CAMPING A UE IN 4G AND 5G OVERLAPPING AREA

CROSS REFERENCE TO RELATED APPLICATIONS

This application is a continuation of International Application No. PCT/KR2021/006127 designating the United States, filed on May 17, 2021, in the Korean Intellectual Property Receiving Office and claiming priority to Indian Provisional Patent Application No. 20 2041020936, filed on May 18, 2020 in the India Intellectual Property Office, and Indian Patent Application No. 202041020936 filed on Apr. 21, 2021, in the India Intellectual Property Office, the disclosures of which are incorporated by reference herein in their entireties.

BACKGROUND

Field

The disclosure relates to camping a User Equipment (UE) on a cell, when the UE is present in an overlapping area of 5$^{th}$ Generation (5G) Stand Alone (SA), 5G Non-SA, and Long Term Evolution LTE. For example, the disclosure relates to a method and system for quick camping in 4G and 5G overlapping area.

Description of Related Art

A User equipment (UE) may be present in a 5$^{th}$ Generation (5G) and 4$^{th}$ Generation (4G) overlapping area, wherein in a Non-Stand Alone (NSA) device, Long Term Evolution (LTE) cells may be connected with a 5GCore (5GC) which may be referred to as Architecture option 7 per 3GPP connectivity standards. For 5G Stand Alone (SA) gNodeB (gNB) is directly connected to 5GC network which may be referred to as Architecture option 2 per 3GPP connectivity standards.

When the UE is powered on or when the UE is recovering from out of service (OOS), or when higher priority scan is triggered, the device takes a long time to camp on best available cell as there is a delay in finding the cell for camping.

FIG. 1 illustrates a conventional method of camping on a cell when the UE is in powered on state or out of service (OOS) recovery state. As seen in FIG. 1 at 102 the UE is powered on or is recovering from OOS mode. At 104, 5G MRU (most recently used) frequencies are scanning for finding the cell. At, 106 the method includes determining whether the cell is found or not. At 108, the UE is camped on the 5G cell if the 5G cell is found. At 110, if the cell is not found then the method comprises performing scan on the 4G MRU frequencies. At 112, the method includes determining whether the cell for camping the UE is found after scanning the 4G MRU frequencies. The UE is camped on the 4G cell with 5GC at 114 if the cell is found. If the cell is not found at 112, then a 5G full band scan is performed at 116 followed by a 4G full band scan at full band scan at 120 if no cell is found at 118 after performing the 5G full band scan.

As discussed above scanning the 5G full band and if the cell is not found then scanning the 4G full band causes a delay and increases latency.

FIG. 2 illustrates a conventional method of camping the UE when the UE is in connected mode. As seen in FIG. 2, at 202 the UE is connected to 5G. At 204 a higher priority PLMN (public land mobile network) search is performed. At 206, the method includes determining whether the UE is connected in 5G mode. At 210, the 5G full band scan is performed in background if the UE is connected to 5G stack, followed by 4G MRU scan and 4G full band scan at 212. If the UE is not connected to 5G, then the 5G full band scan is performed in foreground at 208 followed by 4G MRU and 4G full band scan at 214. At 216, the PLMN is reported to upper layers. This causes a delay in reporting the PLMN to upper layers.

Thus, it is desired to address the above mentioned disadvantages or other shortcomings or at least provide a useful alternative.

SUMMARY

Embodiments of the disclosure provide a method and system for camping the UE on a cell in 5G and 4G overlapping area without delay.

Embodiments of the disclosure improve latency in searching and reporting higher priority PLMN to upper layers during Higher Priority PLMN search.

Embodiments of the disclosure provide a method and system to camp the UE on the best available state when the UE is powered on or is recovering from OOS mode.

Embodiments of the disclosure prepare a combined MRU list for reducing the latency of finding the cell.

Embodiments of the disclosure perform 5G scan in parallel to 4G scan.

Embodiments of the disclosure utilise transceiver sets available in 5G capable UE for reducing camping time of the UE.

Embodiments of the disclosure optimise stored frequency information for eLTE and 5G cells connected to 5G core network.

Example embodiments herein disclose a method of camping a User Equipment (UE) on a cell, when the UE is present in overlapping area of 5$^{th}$ Generation (5G) Stand Alone (SA), 5G Non-SA, and Long Term Evolution LTE. The method comprises: creating a combined Most Recently Used (MRU) list by merging a list 4G MRU frequencies with a Public Land Mobile Network (PLMN) having a 5GC and a list of 5G MRU frequencies; determining whether one of a 4G cell with 5G core and a 5G cell is available for camping the UE by performing a MRU scan on the combined MRU list.

In an example embodiment, performing the MRU scan comprises performing a scan on the list of 5G MRU frequencies in parallel to a scan on the list of 4G MRU frequencies with 5GC.

In an example embodiment, the UE is camped on one of the 4G cell with 5G core and the 5G cell in response to determining that one of the 5G cell and the 4G cell with 5G core is available for camping the UE based on the MRU scan on the combined MRU list.

In an example embodiment, the UE performs a 4G MRU frequency scan on a list of 4G MRU frequencies without 5GC in response to determining that one of the 4G cell with 5G core and the 5G cell is not available for camping the UE based on the MRU scan on the combined MRU list, and camping the UE based on the 4G MRU frequency scan.

In an example embodiment, the UE determines whether a SIB24 message is present providing details about a NR radio. Based on the NR information being present the UE searches for neighboring 5G cell for camping the UE. If the NR information is not present, then the UE 300 is camped on the 4G cell without 5GC.

In an example embodiment, camping the UE based on the 4G MRU frequency scan comprises determining whether a 4G cell without 5GC is available for camping the UE by performing the 4G MRU frequency scan on the list of 4G MRU frequencies without 5GC. The camping based on the 4G MRU scan comprises camping the UE on the 4G cell without 5GC in response to determining that the 4G cell without 5GC is available for camping the UE based on the 4G MRU frequency scan on the list of 4G MRU frequencies without the 5GC. In an example embodiment, the UE performs a 5G full band scan on a list of 5G frequencies and a 4G full band scan on a list of 4G frequencies in parallel, and camping the UE based on the 5G full band scan or the 4G full band scan.

In an example embodiment camping the UE based on the 5G full band scan or the 4G full band scan comprises: determining whether at least one of a 4G cell is available based on the 4G full band scan on the list of 4G frequencies, and whether a 5G cell is available based on the 5G full band scan on the list of 5G frequencies. In an example embodiment, the UE is camped on the 4G cell and terminating the 5G full band scan in response to determining that the 4G cell is available based on the 4G full band scan. While camping the UE on the 4G cells, 4G cell with 5G core are given higher priority over 4G cells without 5GC.

In an example embodiment The UE is camped on the 5G cell and the 4G full band scan is terminated in response to determining that that the 5G cell is available based on the 5G full band scan. In an example embodiment, the UE is camped on the 5G cell and the 4G full band scan is terminated in response to determining that both the 5G cell is available based on the 5G full band scan and the 4G cell is available based on the 4G full band scan.

In an example embodiment, based on the UE being camped on the 4G cell without 5GC, the UE determines whether the SIB24 message is present providing details about the NR radio. Based on the NR information being present the UE searches for neighboring 5G cell for camping the UE. Based on the NR information not being present, the UE 300 is camped on the 4G cell without 5GC.

Accordingly various embodiments herein disclose a method of camping the UE on the cell, based on the UE being in connected state. The method comprises: detecting, by the UE, a higher priority PLMN scan while the UE is in connected mode, determining, by the UE, whether a Rx chain is available; performing, by the UE, a 5G full band scan on a list of 5G frequencies and a 4G full band scan on a list of 4G frequencies in parallel in response to detecting that the Rx chain is available; and camping the UE based on the 5G full band scan or the 4G full band scan.

In an example embodiment camping the UE based on the 5G full band scan or the 4G full band scan comprises determining whether at least one of a 4G cell is available based on the 4G full band scan on the list of 4G MRU frequencies, and whether a 5G cell is available based on the 5G full band scan on the list of 5G MRU frequencies, and in response to determining that the 4G cell is available based on the 4G full band scan: camping the UE on the 4G cell, terminating the 5G full band scan, and reporting a list of scanned cells resulted based on the 4G full band scan, or in response to determining that the 5G cell is available based on the 5G full band scan: camping the UE on the 5G cell, terminating the 4G full band scan, and reporting a list of scanned cells resulted based on the 5G full band scan, or in response to determining that both the 5G cell is available based on the 5G full band scan and the 4G cell is available based on the 4G full band scan: camping the UE on the 5G cell, terminating the 4G full band scan, and reporting a list of scanned cells resulted based on the 4G full band scan and a list of scanned cells resulted based on the 5G full band scan. In an example embodiment, the 4G cell with 5GC are preferred over 4G cell without 5GC.

In an example embodiment performing, by the UE, the 5G full band scan on the list of 5G frequencies and a 4G full band scan on the list of 5G frequencies in parallel comprises: detecting, by the UE, whether the UE is in 5G connected mode; and triggering the 5G full band scan on the list of 5G frequencies in background and the 4G full band scan on the list of 4G frequencies in foreground in response to determining that the UE is in the 5G connected mode, or triggering both the 5G full band scan on the list of 5G frequencies and the 4G full band scan on the list of 5G frequencies in foreground in response to determining that the UE is not in the 5G connected mode.

Accordingly various embodiments herein disclose the UE be camped on a cell, based on the UE being present in overlapping area of $5^{th}$ Generation (5G) Stand Alone (SA), 5G Non-SA, and Long Term Evolution LTE, the UE comprises: a memory, a processor coupled to a communicator comprising communication circuitry, the UE configured to: create a combined Most Recently Used (MRU) list by merging a list 4G MRU frequencies with a Public Land Mobile Network (PLMN) having a 5GC and a list of 5G MRU frequencies, determine whether one of a 4G cell with 5G core and a 5G cell is available for camping the UE by performing a MRU scan on the combined MRU list, camp the UE on one of the 4G cell with 5G core and the 5G cell in response to determining that one of the 5G cell and the 4G cell with 5G core is available for camping the UE based on the MRU scan on the combined MRU list, or perform a 4G MRU frequency scan on a list of 4G MRU frequencies without 5GC in response to determining that one of the 4G cell with 5G core and the 5G cell is not available for camping the UE based on the MRU scan on the combined MRU list, and camping the UE based on the 4G MRU frequency scan.

These and other aspects of the various example embodiments herein will be better appreciated and understood when considered in conjunction with the following description and the accompanying drawings. It should be understood, however, that the following descriptions, while indicating various example embodiments and numerous specific details thereof, are given by way of illustration and not limitation. Many changes and modifications may be made within the scope of the various example embodiments herein without departing from the true spirit thereof, and the embodiments herein include all such modifications.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 10A, 10B and 10c are diagrams illustrating example implementations of the prior art and an example method, according to various embodiments.

DETAILED DESCRIPTION

Figure 1:
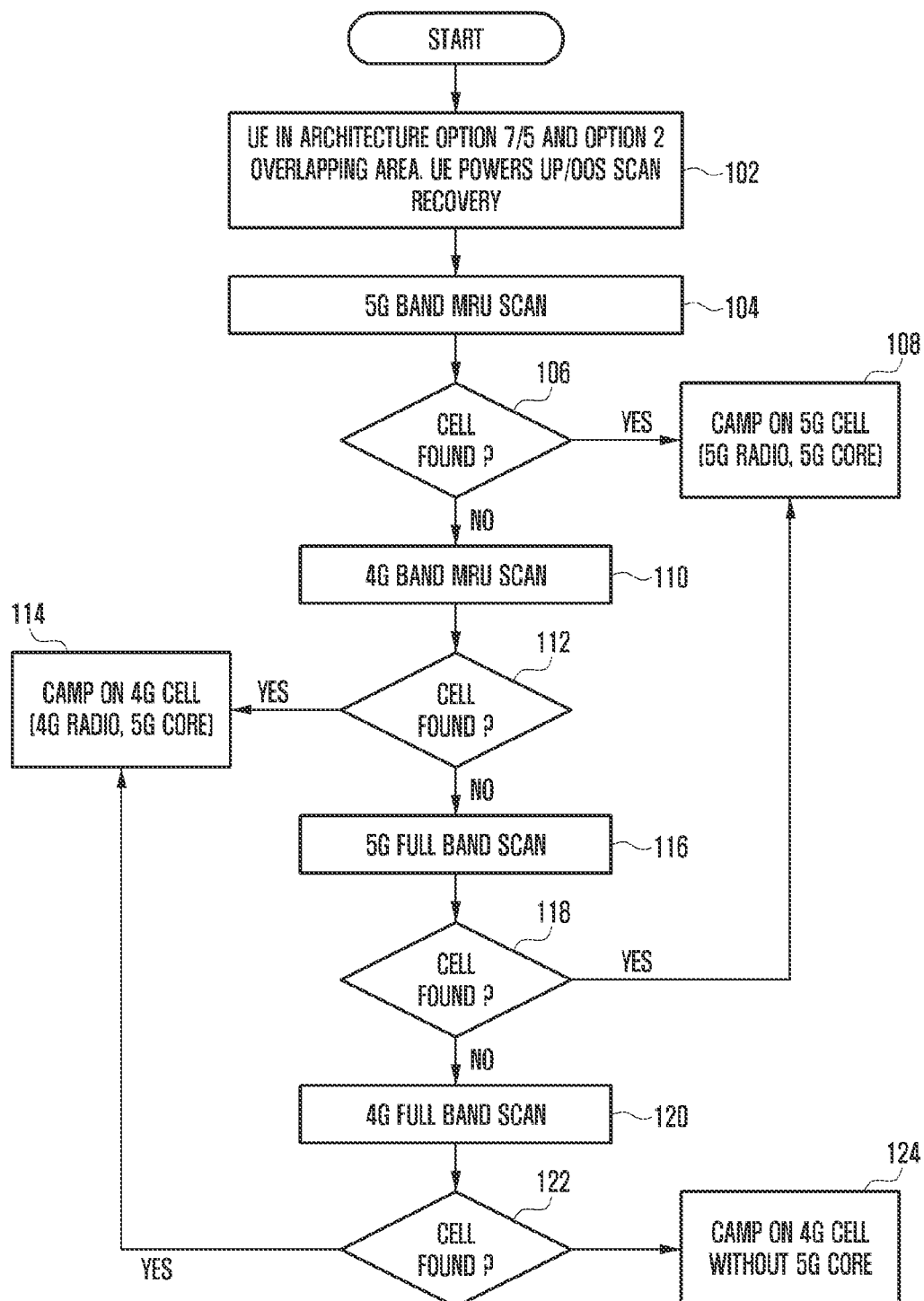
FIG. 1 is a flowchart, illustrating a conventional method of camping a UE when present in a 5G and a 4G overlapping area, according to the prior art.
Figure 2:
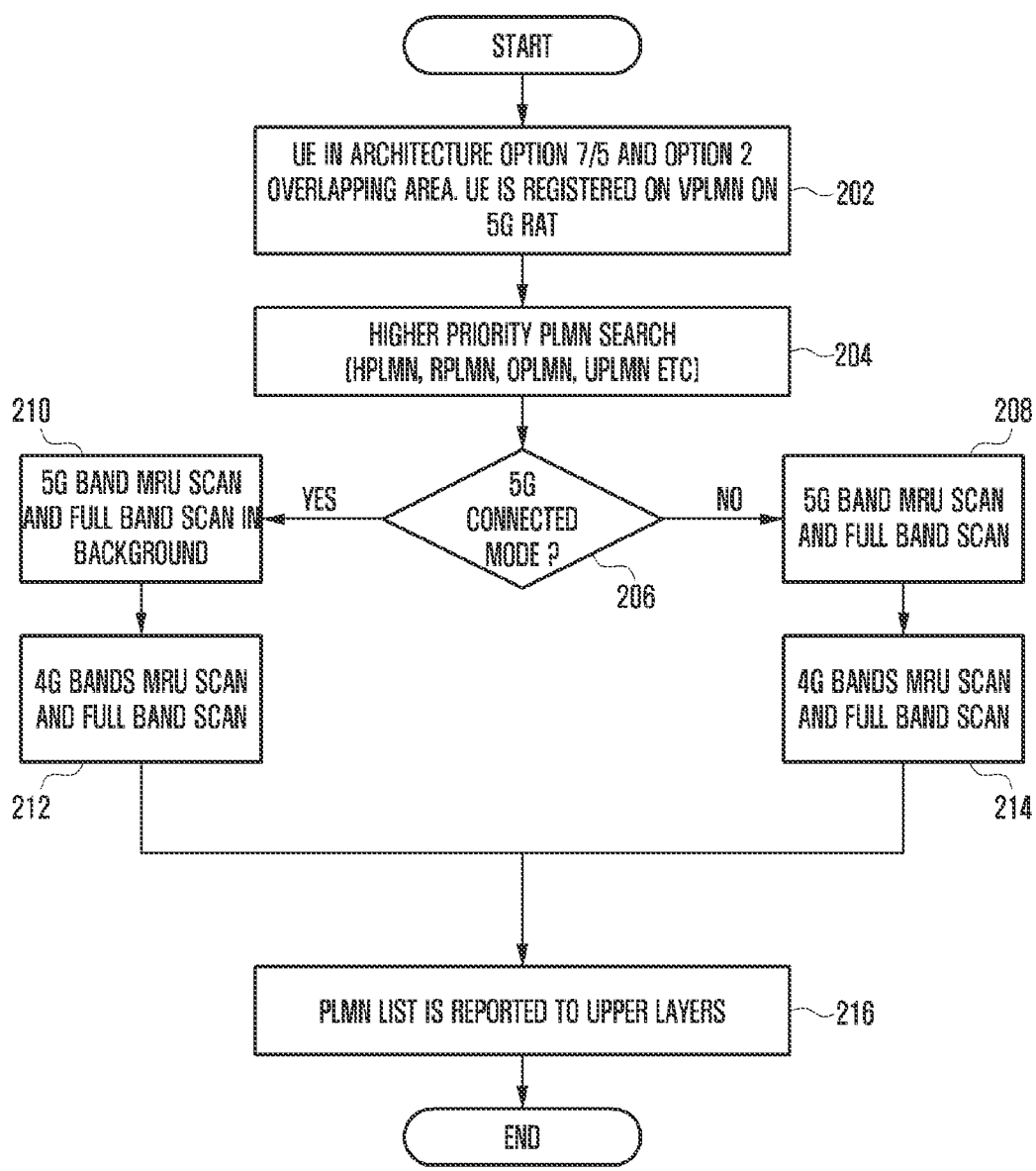
FIG. 2 is a flowchart, illustrating a conventional method of searching and reporting PLMN to upper layers when the UE is in connected mode according to the prior art.

Various example embodiments disclosed herein and the various features and advantageous details thereof are explained with reference to the non-limiting example embodiments that are illustrated in the accompanying drawings and described in the following disclosure. Descriptions of well-known components and processing techniques may be omitted so as to not unnecessarily obscure the embodiments herein. The various example embodiments disclosed herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the various example embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are provided to aid in understanding various technical features and it should be understood that the various example embodiments presented herein are not limited by the accompanying drawings. As such, the disclosure should be construed to extend to any alterations, equivalents and substitutes in addition to those which are particularly set out in the accompanying drawings. Although the terms first, second, etc. may be used herein to describe various elements, these elements should not be limited by these terms. These terms are simply used to distinguish one element from another.

Various example embodiments disclosed herein disclose a method and system for improving latency while camping the UE, when the UE is present in a 4G and a 5G overlapping area. Unlike conventional arts, in example embodiments, a combined MRU list is created by a MRU list creator by merging 5G MRU frequencies and 4G MRU frequencies having PLMN supported by 5G core (5GC). A cell selector scans the combined MRU list for finding the cell for camping the UE. If the UE is still not camped, then the cell selector performs a 5G full band scan using a first transceiver of the UE and performs a 4G full band scan in parallel using another transceiver of the UE.

Thus scanning the combined MRU list and/or performing the parallel 5G full band scan and 4G full band helps in reducing the latency of camping the UE thereby enabling quick camping.

Unlike conventional arts, the example embodiments have less delay in camping the cell while recovering from OOS mode or when powered on or when in in a connected mode. The various embodiments also reduce the delay while reporting the higher order PLMN.

Referring now to the drawings and more particularly to FIGS. 3, 4, 5, 6, 7, 8 and 9 where similar reference characters denote corresponding features consistently throughout the figures, there are shown various example embodiments.

Figure 3A:
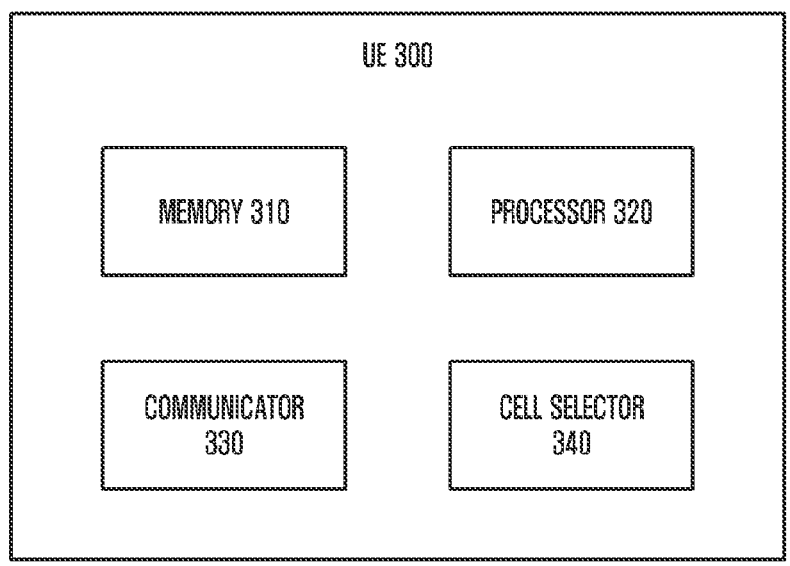
FIG. 3A is a block diagram illustrating an example configuration of a UE for camping on the cell, according to various embodiments.

FIG. 3A is a block diagram illustrating an example UE 300, wherein the UE 300 is present in 5G and 4G overlapping area according to various embodiments. The UE 300 may be in a connected state or idle state. The overlapping area may refer, for example, to the area where 4G cell connected with EPC or 5G Core are present.

The UE 300 may include, for example, and without limitation, a smart social robot, a smart watch, a cellular phone, a smart phone, a Personal Digital Assistant (PDA), a tablet computer, a laptop computer, a music player, a video player, an Internet of things (IoT) device, a smart speaker, an Artificial intelligent (AI) device, or the like. The UE 300 includes a memory 310, a processor (e.g., including processing circuitry) 320, a communicator (e.g., including communication circuitry) 330 and a cell selector (e.g., including processing circuitry and/or executable program elements) 340.

The processor 320 is coupled to the memory 310, and the communicator 330. The processor 320 may include various processing circuitry, such as, for example, and without limitation, a general purpose processor, such as a central processing unit (CPU), an application processor (AP), a graphics-only processing unit such as a graphics processing unit (GPU), a visual processing unit (VPU), and the like. The processor 320 may include multiple cores or may have a single core. The processor 320 is coupled to the cell selector 340, the memory 310, and the communicator 330. The processor 320 may include various processing circuitry and may be configured to execute instructions stored in the memory 310 and to perform various other processes.

The memory 310 stores instructions to be executed by the processor 320. The memory 310 may include non-volatile storage elements. Examples of such non-volatile storage elements may include magnetic hard discs, optical discs, floppy discs, flash memories, or forms of erasable programmable read-only memories (EPROM) or electrically erasable programmable read-only memories (EEPROM). In addition, the memory 310 may, in some examples, be considered a non-transitory storage medium. The term "non-transitory" may indicate that the storage medium is not embodied in a carrier wave or a propagated signal. However, the term "non-transitory" should not be interpreted to be non-movable. In some examples, the memory 310 can be configured to store larger amounts of information than the memory. In certain examples, a non-transitory storage medium may store data that can, over time, change (e.g., in Random Access Memory (RAM) or cache).

The communicator 330 may include various communication circuitry and may be configured for communicating internally between internal hardware components and with external devices via one or more networks. The communicator 330 may include an electronic circuit specific to a standard that enables communication between internal hardware components and with external devices via one or more networks.

The cell selector 340 may include various processing circuitry and/or executable program elements and may be configured for searching a best available cell for the UE 300 for camping. The cell selector 340 may select the cell when the UE is either in connected state or in idle state and when the UE 300 is present in either of option 1, option 2 and option 7 of 3GPP standards of communication. As per 3GPP option 1 indicates that the UE 300 is in 4G standalone mode where the UE 300 is connected with eLTE Radio and EPC (Evolved Packet Core). Option 2 indicates that the UE 300 is in 5G standalone mode where the UE 300 is connected with NR Radio and 5G Core. Option 3 indicates that the UE 300 is in 4G+5G mode wherein the UE 300 is connected with eLTE Radio and 5G Core.

In an embodiment, when the UE 300 is switched on or is in idle state then the UE needs to be camped on the cell for communication. The time taken by the UE 300 should be very low. The below described method ensures minimal and/or reduced delay in camping the UE 300 thereby improving latency.

In an embodiment, in finding the cell for camping, the cell selector 340, may create a combined MRU (Most recently used) list by merging a list of 4G MRU frequencies with a Public Land Mobile Network (PLMN) having a 5GC and a list of 5G MRU frequencies. The 4G MRU frequencies with PLMN having 5GC comprises the 4G frequencies which are recently used by the UE 300 and which have 5G core. The 5G MRU frequencies are the 5G frequencies which are recently used by the UE 300.

The cell selector 340 may perform a scan on the combined MRU list for determining whether one of a 4G cell with 5G core and a 5G cell is available for camping the UE 300. The 4G cells are the cell supporting 4G Radio and connected with EPC or 5G core. The 5G cells are the cell supporting 5G radio connected with 5G core.

The UE 300 is camped on the 4G cell with 5G core if the 4G cell with 5G core is available. In an embodiment, the UE 300 is camped on the 5G cell if the 5G cell is available. In an embodiment if both the 4G cell with 5G core and the 5G cell are available then the cell selector 340 selects the 5G cell for camping.

If both the 4G cell with 5G core and the 5G cell are not available the cell selector 340 performs a 4G MRU frequency scan. The 4G MRU frequency scan is performed on a list of 4G MRU frequencies without 5GC. The UE 300 is camped on a 4G cell with EPC core if the cell 4G cell with EPC core is found. In an embodiment, the UE determines whether a SIB (system information block) 24 message is present providing details about a NR radio after camping on the 4G cell with EPC core. If the NR information is present the UE searches for neighboring 5G cell for camping the UE. If the NR information is not present, the UE 300 is camped on the 4G cell without 5GC.

In an embodiment, if the cell is not found in the 4G MRU scan, the cell selector 340 performs a 4G full band and 5G full band scan in parallel. The 4G full band scan includes scanning all the available 4G frequencies in a 4G list with and without 5G core for finding the 4Gcell with or without 5G core for camping the UE 300. The 5G full band scan includes scanning all the available 5G frequencies in a 5G list for finding the 5G cell for camping the UE 300.

During parallel scanning of 4G full band and 5G full band, the UE 300 the may be camped on either 4G cell or the 5G cell. If the 4G cell is found before the 5G cell then the UE 300 is camped on the 4G cell. The 4G cell on which the UE 300 is camped during the parallel scanning may have PLMN supported by 5GC or EPC. In an embodiment, the UE determines whether the SIB24 message is present providing details about the NR radio. If the NR information is present the UE searches for neighboring 5G cell for camping the UE. If the NR information is not present, the UE 300 is camped on the 4G cell without 5GC.

If the 5G cell is found before the 4G cell the UE 300 is camped on the 5G cell. In an embodiment, if both the 4G cell and the 5C cell are found simultaneously, the UE 300 is camped on the 5G cell.

If the UE 300 is not camped on any cell during parallel scanning of 4G full band and 5G full band, due to unavailability of the cell, the UE 300 performs a legacy scan. The legacy scan includes scanning 3G frequencies followed by 2G frequencies for finding the cell for camping the UE 300.

In an embodiment, when the UE 300 is in connected state, the UE 300 performs a higher priority PLMN search. Searching higher priority PLMN is explained in 3GPP specification at 3GPP SP TS 23.122. under Automatic Network Selection Mode Procedure.

The UE 300 also determines the cell to which it is connected. The UE 300 performs the 5G full band scan and the 4G full band scan in parallel. If the UE 300 determines that the cell to which the UE 300 is already connected is the 5G cell the 5G full scan band is performed in background. The 5G full band scan is performed on the list of 5G frequencies and the 4G full band scan is performed on the list of 4G frequencies.

The cell found during scanning is reported to upper layers. The upper layers are the mobility management layer and the application layer. FIG. 3A shows a limited overview of the UE 300 but it is to be understood that other embodiments are not limited thereto.

Figure 3B:
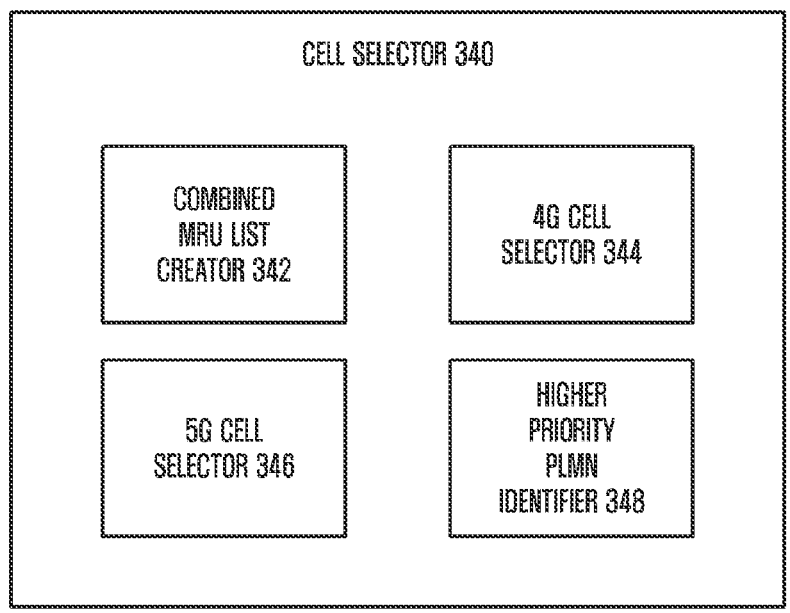
FIG. 3B is a block diagram illustrating various components of a cell selector for camping the UE, according to various embodiments.

FIG. 3B is a block diagram illustrating an example configuration of the cell selector 340 illustrating various components for selecting the cell for camping the UE 300, when the UE is present in overlapping area of 5G SA, 5G Non-SA, and LTE according to various embodiments.

The cell selector 340 includes a combined MRU list creator (e.g., including various processing circuitry and/or executable program elements) 342, a 4G cell selector (e.g., including various processing circuitry and/or executable program elements) 344, a 5G cell selector (e.g., including various processing circuitry and/or executable program elements) 346 and a higher priority PLMN identifier (e.g., including various processing circuitry and/or executable program elements) 348. When the UE 300 is in idle mode or is switched on or is recovering from out of service mode then the UE 300 needs to camp on a cell for communication. The cell on which the UE 300 is camped may be a 5G cell or a 4G cell based on the availability.

As discussed above existing methods first perform a 5G MRU scan followed by a 4GMRU scan. If the cell is not found in MRU frequencies then the UE 300 performs a 5G full band scan. If the cell is not found in 5G full band scan then the UE 300 performs 4G full band scan, due to which there is a lot of (e.g., relatively long) delay. Whereas the current method reduces the delay in searching the cell for camping the UE 300. The combined MRU list creator 342 may include various processing circuitry and/or executable program elements and creates the combined MRU list by merging the list of 4G MRU frequencies having PLMN supported by 5GC and the list of 5G MRU frequencies. The 4G cell selector 344 and the 5G cell selector 346 may include various processing circuitry and/or executable program elements and perform a scan on the combined MRU list for finding the 4G cell with 5G core and the 5G cell respectively for camping the UE 300. The UE 300 is camped on the 4G cell with 5G core if the 4G cell with 5G core is found first or is camped on 5G cell if the 5G cell is found first.

In an embodiment, if the cell for camping is not found in the combined MRU list, then the 4G cell selector 344 performs the scan on the 4G MRU frequencies without 5GC (with EPC) for finding the cell for camping the UE 300. If the 4G cell with EPC is found then the UE 300 is camped. In an embodiment, the UE (e.g., higher priority PLMN identifier 348) determines whether the SIB24 message is present providing details about the NR radio. If the NR information is present then the UE (e.g., higher priority PLMN identifier 348) searches for neighboring 5G cell for camping the UE. If the NR information is not present, then the UE 300 is camped on the 4G cell without 5GC.

If the 4G cell with EPC is not found in the list of 4G MRU frequencies with EPC, then the 5G cell selector 346 performs the 5G full band scan and the 4G cell selector 344 performs the 4G full band scan in parallel. The 4G full band scan is performed on the list comprising all the 4G frequencies with 5GC and EPC. The 5G full band scan is performed on the list comprising all the 5G frequencies. If the 5G cell selector 346 finds the 5G cell during the 5G full band scan, then the UE 300 is camped on the 5G cell found during the full band scan and the 4G full band scan is terminated. Similarly if the 4G cell selector 344 finds the 4G cell during the 4G full band scan, then the UE 300 is camped on the 4G cell found during the full band scan and the 5G full band scan is terminated. In an embodiment, during the 4G full band scan the 4G cell selector 344 searches for the 4G cell with 5GC first and if the 4G cell with 5GC is not found then the 4G cell selector 344 searches for the 4G cell without 5GC. In an embodiment, the UE determines whether the SIB24 message is present providing details about the NR radio. If the NR information is present the UE searches for neighboring 5G cell for camping the UE. If the NR information is not present, the UE 300 is camped on the 4G cell without 5GC.

If the cell for camping the UE 300 is not found after the 4G full band scan and the 5G full band scan, then the cell selector 340 performs the legacy scan.

When the UE 300 is in connected mode then the cell selector 340 performs the high priority PLMN scan using the higher priority PLMN identifier 348.

Figure 4:
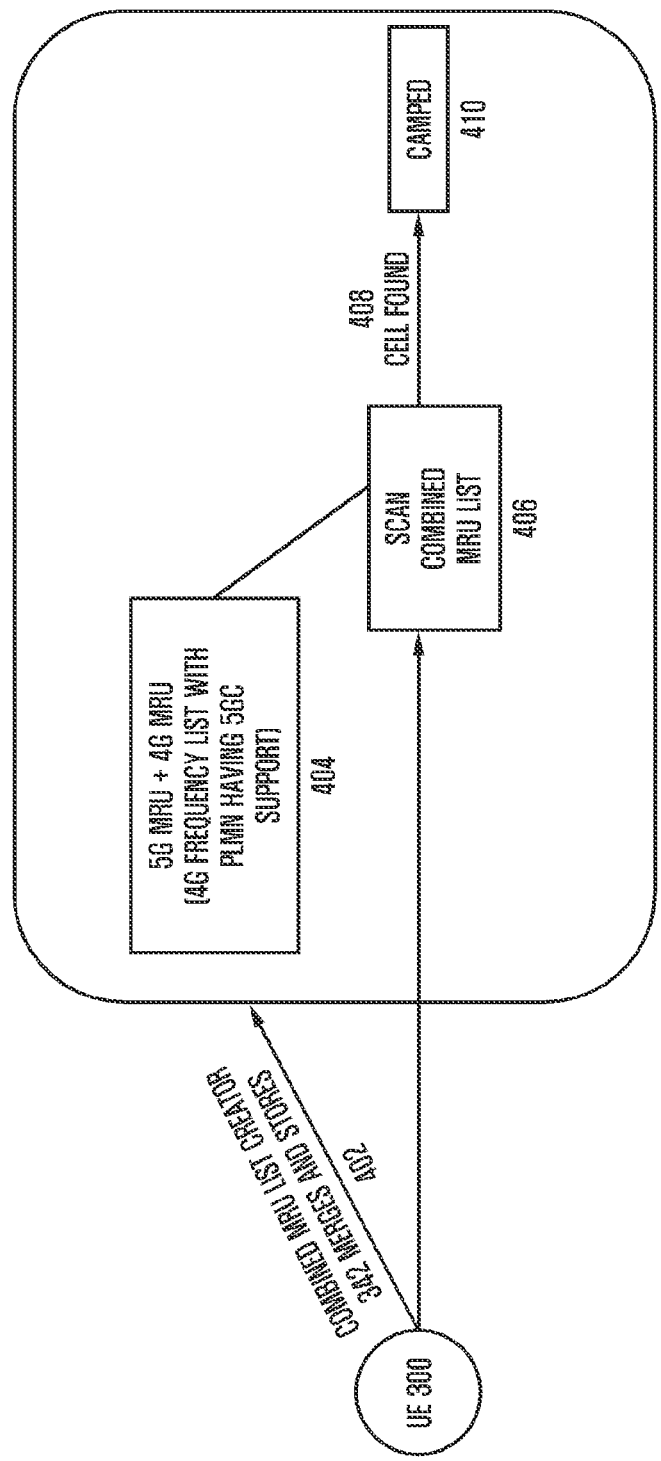
FIG. 4 is a diagram illustrating example camping of the UE based on a combined MRU scan, according to various embodiments.

FIG. 4 is a diagram, illustrating example creation of combined MRU list, according various embodiments.

The 4G MRU frequencies include the 4G frequencies which have been recently used by UE 300. The 4G MRU frequencies include two types the 4G frequencies with PLMN having 5GC support (based on LTE cell indication to support 5G core network in SIB1 using IE: CellAccessRelatedInfoList-5GC) and 4G frequencies with PLMN not having 5GC support. The 5G MRU frequencies include the 5G frequencies which have been recently used by the UE 300.

At 402, the combined MRU list creator 342, merges the list comprising 5G MRU frequencies with the list comprising the 4G MRU frequencies having PLMN supported by the 5GC. The combined MRU list is stored 404 and scanned 406 by the 4G cell selector 344 and the 5G cell selector for selecting either the 4G cell or the 5G cell respectively. The UE 300 is camped 410 on the best available cell in found after the combined MRU scan. If the cell is not found after the combined MRU scan, the 4G MRU frequency list comprising 4G MRU frequencies without 5GC are scanned, Thus the two frequency lists namely the 5G MRU frequency list and the 4G MRU frequency list having PLMN supported by 5GC are scanned together which saves the time as compared to the prior art where the 5G MRU frequencies are scanned first followed by 4G MRU frequencies with 5GC, further followed by 4G MRU frequencies without 5GC.

Figure 5:
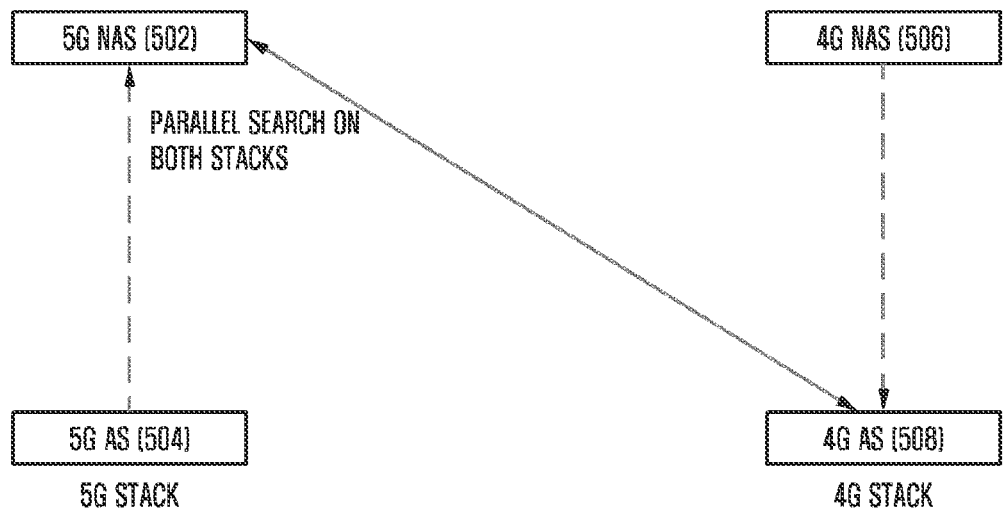
FIG. 5 is a diagram illustrating an example new interface between 5G NAS and 4G AS according to various embodiments.

FIG. 5 is a diagram, illustrating an example interface for parallel scanning of the 4G full band scan and the 5G full band scan, according to various embodiments.

As illustrate in FIG. 5, 502 indicates the 5GNAS in communication with 5GAS 504. Similarly 506 indicates 4GNAS which is communicating with 4GAS 508. A new interface is introduced between 5G NAS 502 and 4G AS 508 which enables communication while parallel scanning of the 4G full band and the 5G full band.

In an embodiment, the new interface provides communication between 5G NAS (upper layers) and 4G AS (lower layer). 5G NAS and 4GAS may exchange commands related to frequency band and PLMN selection.

Figure 6:
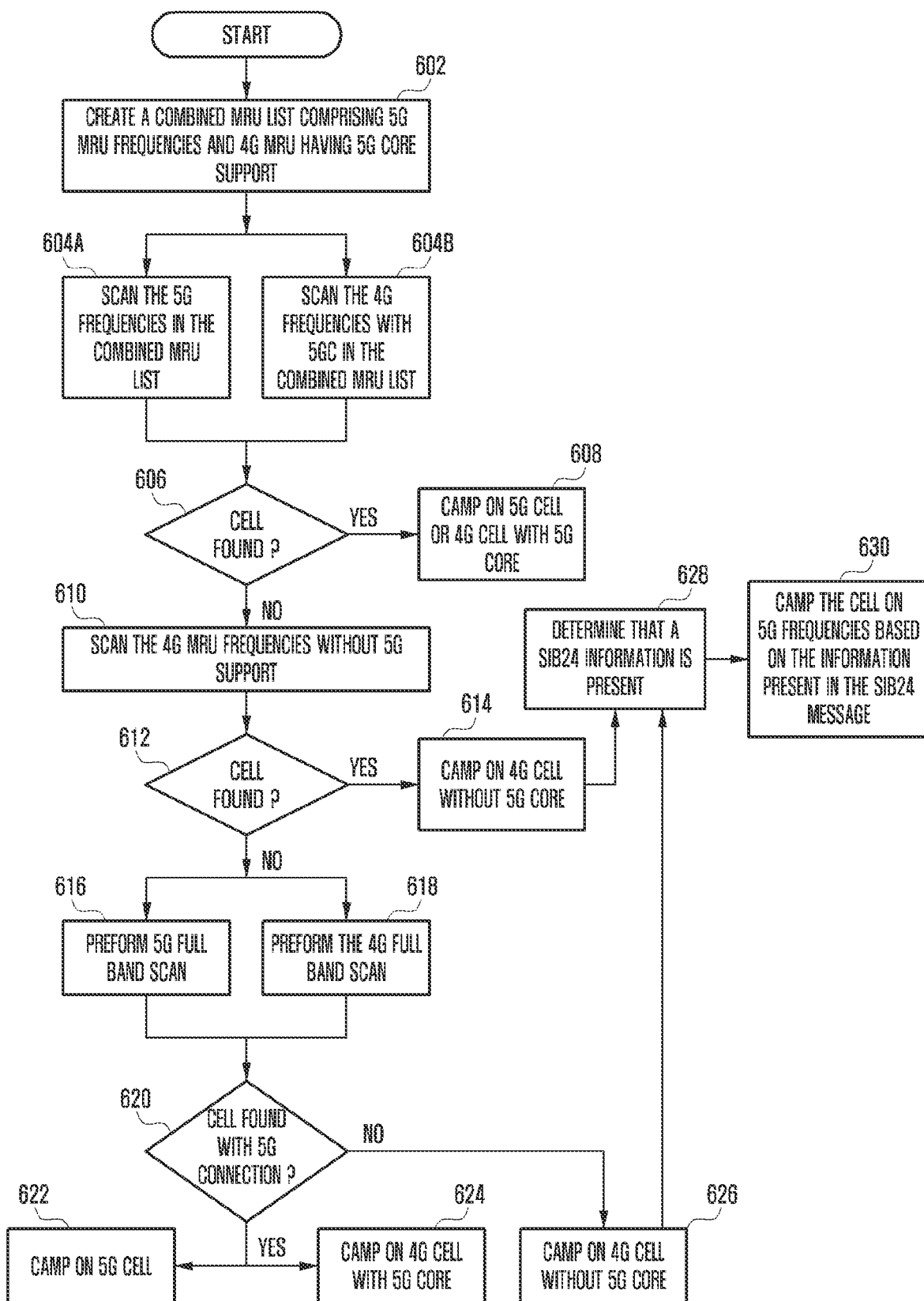
FIG. 6 is a flowchart, illustrating an example method for camping the UE when present in a 4G and 5G overlapping area, according to various embodiments.

FIG. 6 is a flowchart illustrating an example method for camping the UE 300 in the 4G and 5G overlapping area when the UE 300 is powered on or is in OOS recovery mode, according to various embodiments.

At 602, the combined MRU list creator 342 merges the list comprising 5G MRU frequencies and the list comprising 4G MRU frequencies with PLMN having 5GC for creating the combined MRU list. At 604A and 604B, the 4G cell selector 344 and the 5G cell selector 346 scans the combined MRU list for finding the cell for camping the UE 300. At 606, the 4G cell selector 344 and the 5G cell selector 346 determines whether the 5G cell or the 4G cell having PLMN with 5GC is found. If the cell is not found to the method performs operation 610. In an embodiment, at 608, the UE 300 is camped on the 5G cell in response to determining that the 5G cell selector 346 has found the 5G cell after scanning the combined MRU list. In an embodiment at 608, the UE 300 is camped on the 4G cell having PLMN supported with 5GC in response to determining that the 4G cell selector 344 has found the 4G cell having PLMN supported with 5GC. Once the UE 300 is camped at 608, the method flow is stopped here.

At 610, the 4G cell selector 344 scans the list comprising 4G MRU frequencies without 5GC. At 612, the cell selector 344 determines whether the 4G cell without 5GC is found. If the 4G cell without 5GC is found, the method proceeds to 614 else to 616. At 614, the UE 300 is camped on the 4G cell without 5GC found after scanning the list comprising the 4G cell without 5GC. Once the UE 300 is camped at 614, the method proceeds to 628. At 628, the UE determines whether the SIB24 message is present providing details about the NR radio. If the NR information is present the UE searches for neighboring 5G cell for camping the UE and the UE 300 is camped on the 5G cell at 630.

If the NR information is not present, the UE 300 is camped on the 4G cell without 5GC in 614 and the method flow is stopped. However if the UE 300 is not camped at 614, the method flow 600 is directed to 616 and 618.

At 616, the 5G cell selector 346 scans the list including all the 5G frequencies which may be referred to as 5G full band scan. At 618, the 4G cell selector 344 scans the list including all the 4G frequencies which may be referred to as 4G full band scan in parallel to the 5G full band scan at 616. At 620, the 4G cell selector 344 and the 5G cell selector 346 determines whether the 4G cell with or without PLMN having 5GC or the 5G cell is found for camping the UE 300 during the parallel scanning of the 4G full band and the 5G full band. If the 4G cell with 5GC is found the method 620 proceeds to 624. If the 5G cell is found then the method proceeds to 622. If neither 4G cell with 5GC nor 5G cell is found the method proceeds to 626. In an embodiment The UE 300 is camped on either the 4G cell with 5GC or the 5G cell whichever is found first. For example if the 5G cell during the 5G full band scan at 616 is found first then the UE 300 is camped on the 5G cell and the 4G full band scanning at 618 is terminated.

At 624, the UE 300 is camped on the 4G cell with 5GC found during scanning at 618 and the scanning of the 5G full band at 616 is terminated.

At 622, the UE 300 is camped on the 5G cell found during the 5G full band scan at 616, and the 4G full band scan at 618 is terminated.

In an embodiment at 626, the UE 300 is camped on the 4G cell without 5GC found during the 4G full band scan at 618. In an embodiment at 626, the 4G cell selector 344 determines whether a SIB24 message is present providing details about NR radio at 628. If the NR information is present then the cell selector 340 searches for the 5G cell for camping the UE 300 and camps the UE at 630. If the NR information is not present, then the UE 300 is camped on the 4G cell without 5GC.

If the UE 300 is not camped on any cell after the parallel scanning of the 4G full band the 5G full band, the legacy scan is performed for finding the cell for camping the UE 300.

Figure 7:
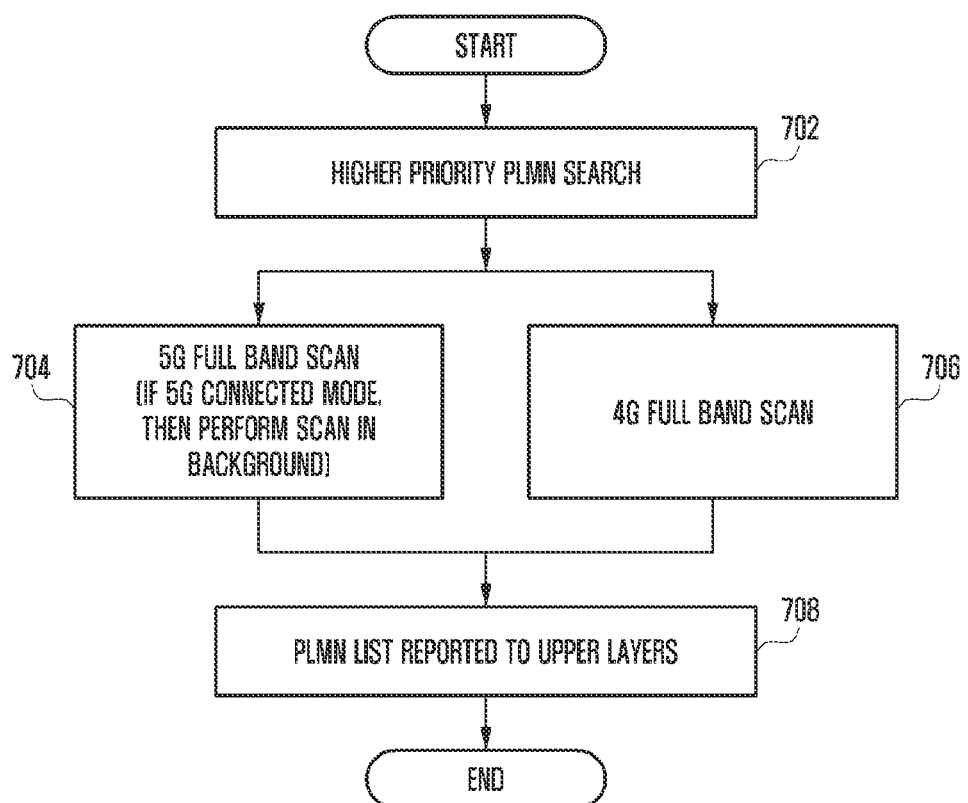
FIG. 7 is a flowchart, illustrating an example method for reporting higher order PLMN to upper layers when the UE is in connected mode according to various embodiments.

FIG. 7 is a flowchart illustrating a method for camping the UE 300, when the UE 300 is in the 4G and 5G overlapping area and is in connected state according to various embodiments.

In an embodiment, the UE 300 is already camped on any cell and is in connected mode. The higher priority PLMN search is performed to camp the UE 300 on a higher priority cell.

The operations for searching the higher priority PLMN are same as or similar to that explained in FIG. 7.

At 702, the UE 300 is in connected state and the UE 300 initiates a searches for the higher priority PLMN. The UE 300 scans the combined MRU list, followed by 4G MRU frequencies without 5GC.

Further, step 704 and step 706 are performed in parallel. At 704, 5G full band scan is performed. At 706 4G full band scan is performed. In an embodiment, if the 5G stack is in connected mode, then the 5G full band scan is performed in background.

At 708, the PLMN list including the available cell is reported to higher layers.

Figure 8:
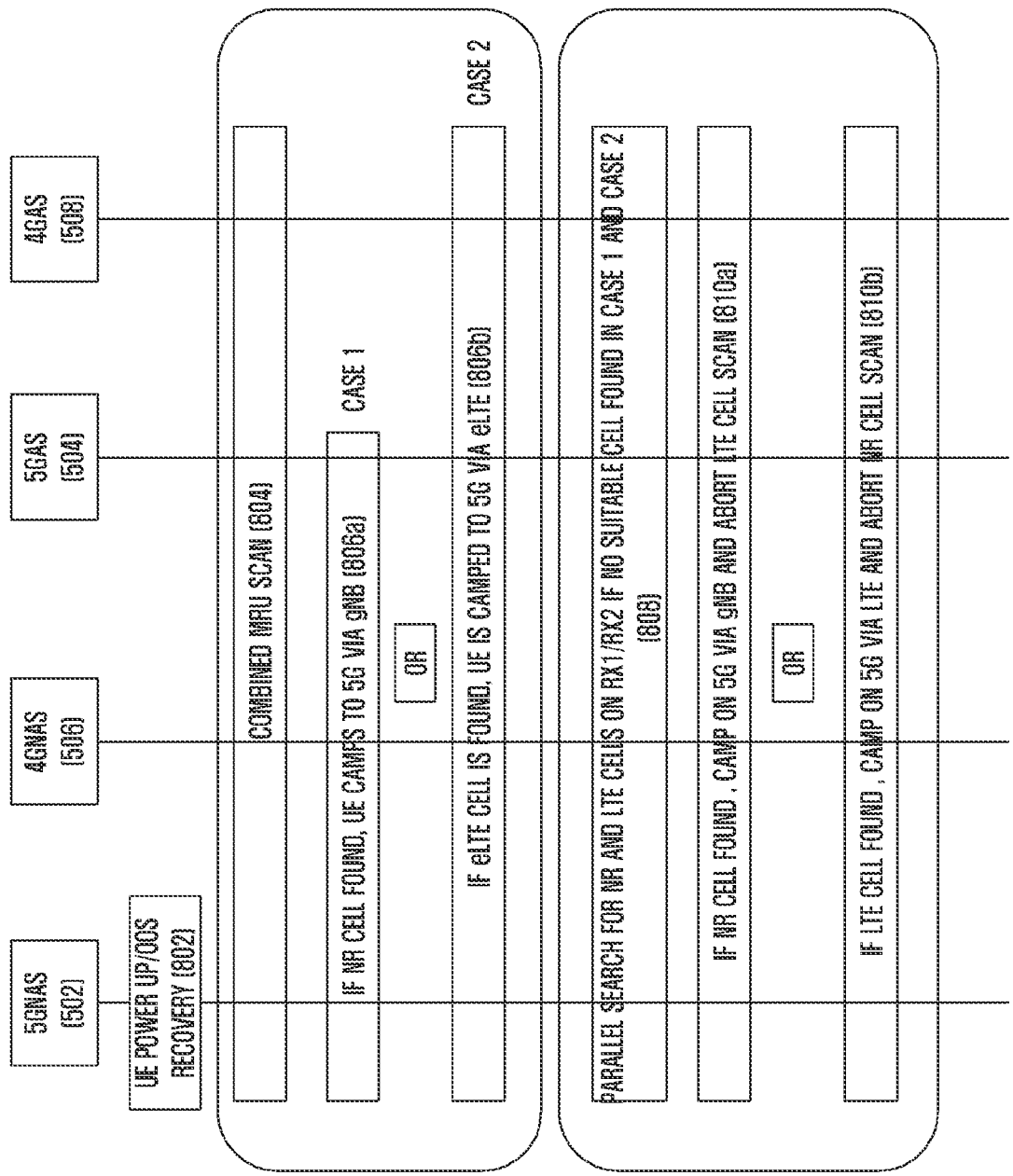
FIG. 8 is a signal flow diagram, illustrating an example sequence for camping the UE when present in a 4G and 5G overlapping area, according to various embodiments.

FIG. 8 is a signal flow diagram, illustrating an example method for camping the UE 300 in the 4G and 5G overlapping area when the UE 300 is powered on or is in OOS recovery mode, according to various embodiments.

As illustrate in FIG. 8 502 indicates 5G Non-Access Stratum (5G-NAS), 506 indicates 4G Non-Access Stratum (4G-NAS), 504 indicates 5G Standalone (5G-AS) and 508 indicates 4G Access Stratum (4G-AS).

At 802, the UE 300 is powered up or is recovering from OOS mode. At 804, the combined MRU scan is performed on the list of the 5G MRU frequencies and the list of 4G MRU frequencies with 5GC. At 806*a*, the UE 300 is camped on the 5G cell if the 5G cell is found after scanning the combined MRU list. In an embodiment at 806*b*, the UE 300 is camped on the 4G cell having PLMN supported with 5GC if the 4G cell having PLMN supported with 5GC is found.

If the UE 300 is not camped on any cell after combined MRU scan then the full band 5G scan is performed in parallel to full band 4G scan at 808. In an embodiment, the scan is performed on the 4GMRU frequencies without 5GC before performing full band scans at 808.

At 810*a*, the UE 300 is camped on the 5G cell if the 5G cell is found during the full band scan and the 4G full band scan is terminated. At 810*b*, the UE 300 is camped in the 4G cell with 5GC if the 4G cell with the 5G core is found first and the 5G full band scan is terminated.

Figure 9:
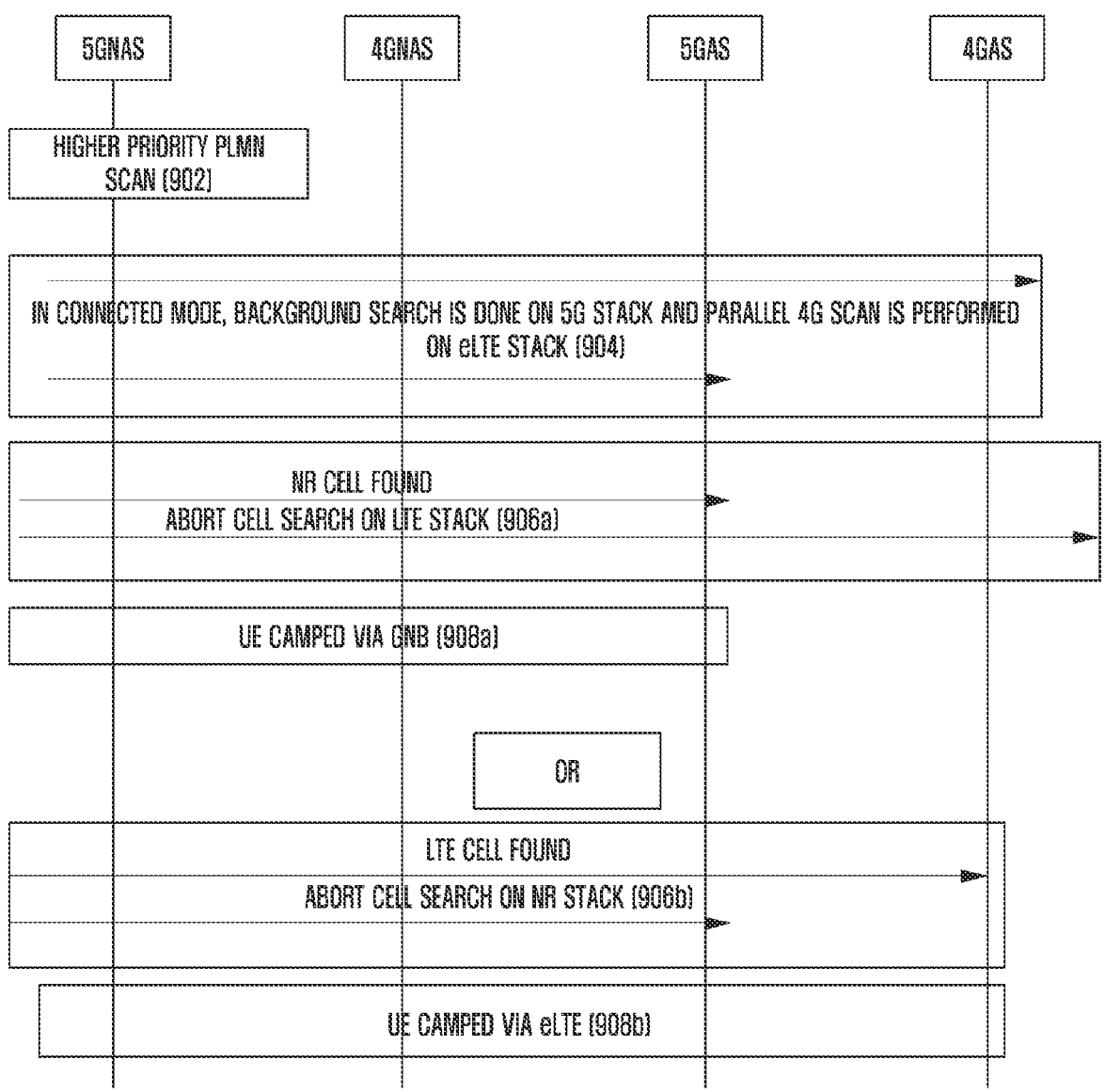
FIG. 9 is a signal flow diagram, illustrating an example sequence for reporting higher order PLMN to upper layers when the UE is in connected mode according to various embodiments.

FIG. 9 is signal flow diagram, illustrating an example method of performing the higher priority PLMN search for camping the UE 300, according to various embodiments.

As illustrated in FIG. 9, at 902, the higher priority PLMN scan is performed. The UE 300 may be in 5G connected mode or may not be connected to a 5G stack. At 904, the 5G full band scan is performed in parallel to 4G full band scan. If the UE 300 is connected to 5G stack already then the 5G full band scan is performed in background.

At Step 906*a*, the 5G cell is found and the 4G full band scan is terminated. At 908*a*, the UE 300 is camped on the 5G cell. In an embodiment if the 4G cell with 5GC is found at 906*b*, then the 5G full band scan is terminated. At 908*b* the UE 300 is camped on the 4G cell with 5GC.

FIG. 10A is a diagram illustrating a conventional implementation indicating a delay in camping the UE on 4G where stored frequencies are not present due to 5G scan, according to the prior art.

As illustrated in FIG. 10A, the UE 300 is present in location A and is registered on 5G. The UE 300 moves to other city at location B via airplane. During travel, the UE 300 is in airplane mode. Once the airplane mode is off after reaching the location B, the UE 300 scans 5G MRU frequencies. If no cell is found the UE performs the scan on the 4G MRU frequencies, In an embodiment, if no cell is available in the 4G MRU scan MRU scan, the UE 300 performs 5G full band followed by 4G full band scan. If the 5G frequencies are not available, the UE 300 is camped on the cell available in the 4G frequencies. Thus as seen, there is a large delay in camping the UE 300 on the 4G cell.

Figure 10B:
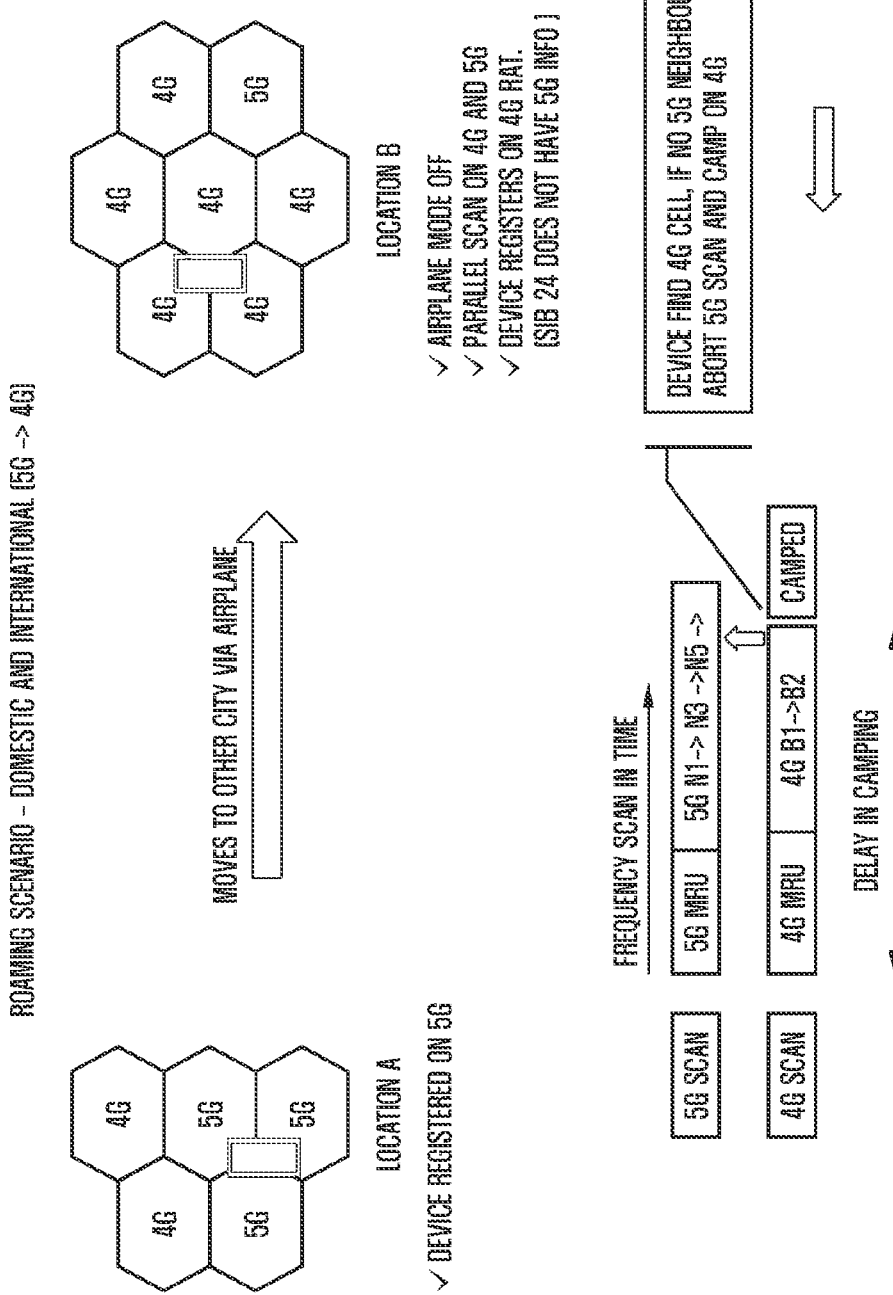

FIG. 10B is a diagram, illustrating an example method, according to various embodiments.

As illustrated in FIG. 10B, the UE 300 is present in location A and is registered on 5G. The UE 300 moves to other city at location B via airplane. During travel, the UE 300 is in airplane mode. Once the airplane mode is off after reaching the location B, the UE 300 scans 5G MRU frequencies in parallel to 4G MRU frequencies, which is the MRU scan on the combined MRU list as explained above. The UE 300 camps on any cell found in the combined MRU scan, thus saving the camping time However if no cell is available in the combined MRU scan, the UE 300 performs 5G full band scan in parallel to 4G full band scan. If the 5G frequencies are not available, the UE 300 is camped on the cell available in the 4G frequencies. Thus as seen, there the delay in camping the UE 300 is reduced.

FIG. 10C is a diagram, illustrating an example method, according to various embodiments.

As illustrated in FIG. 10C, the UE 300 is present in location A and is registered on 5G. The UE 300 moves to other city at location B via airplane. During travel, the UE 300 is in airplane mode. Once the airplane mode is off after reaching the location B, the UE 300 scans 5G MRU frequencies in parallel to 4G MRU frequencies, which is the MRU scan on the combined MRU list as explained above. The UE 300 camps on any cell found in the combined MRU scan, thus saving the camping time However if no cell is available in the combined MRU scan, the UE 300 performs 5G full band scan in parallel to 4G full band scan. The UE 300 find 4G cell. Here the UE 300 finds SIB24 message and reads the information about neighboring 5G cells in the SIB24 message. Thus the UE 300 is camped on the 5G cell based on the information present in the SIB24 message. Thus as seen, there the delay in camping the UE 300 is reduced.

In an embodiment, if the UE 300 is not camped on any cell after the parallel scanning of the 4G full band the 5G full band, the legacy scan is performed for finding the cell for camping the UE 300.

The embodiments disclosed herein can be implemented using at least one software program running on at least one hardware device and performing network management functions to control the elements.

The foregoing description of various example embodiments discloses the general nature of the embodiments herein that others can, by applying current knowledge, readily modify and/or adapt for various applications such specific embodiments without departing from the disclosed concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been illustrated and described with reference to various example embodiments, it will the understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. A method of camping a user equipment (UE) on a cell, based the UE being present in overlapping $5^{th}$ generation (5G) and $4^{th}$ generation (4G) areas, the method comprising:
   creating, by the UE, a combined most recently used (MRU) list by merging a list of 4G MRU frequencies having a 5G core (5GC) and a list of 5G MRU frequencies;
   determining, by the UE, whether one of a 4G cell with 5G core and a 5G cell is available for camping the UE by performing a MRU scan on the combined MRU list; and
   performing, by the UE, at least one of:
      camping on one of the 4G cell with 5G core (5GC) and the 5G cell in response to determining that one of the 5G cell and the 4G cell with 5G core is available for camping the UE based on the MRU scan on the combined MRU list, and
      performing a 4G MRU frequency scan on a list of 4G MRU frequencies without 5GC in response to determining that one of the 4G cell with 5G core and the 5G cell is not available for camping the UE based on the MRU scan on the combined MRU list, and camping the UE based on the 4G MRU frequency scan.

2. The method as claimed in claim 1, wherein performing the MRU scan on the combined MRU list comprises performing a 5G MRU frequency scan on the list of 5G MRU frequencies in parallel to with a scan on a 4G with 5GC MRU frequency scan on the list of 4G MRU frequencies having the 5GC.

3. The method as claimed in claim 1, wherein performing the MRU scan on the combined MRU list comprises performing a 5G MRU frequency scan on the list of 5G MRU frequencies followed by a 4G with 5GC MRU frequency scan on the list of 4G MRU frequencies having the 5GC.

4. The method as claimed in claim 1, wherein camping the UE based on the 4G MRU frequency scan comprises:
   determining, by the UE, whether a 4G cell without 5GC is available for camping the UE by performing the 4G MRU frequency scan on the list of 4G MRU frequencies without 5GC; and
   performing, by the UE, at least one of:
      camping on the 4G cell without 5GC in response to determining that the 4G cell without 5GC is available for camping the UE based on the 4G MRU frequency scan on the list of 4G MRU frequencies without 5GC; and
      performing a 5G full band scan on a list of 5G frequencies and a 4G full band scan on a list of 4G frequencies in parallel, and camping the UE based on the 5G full band scan or the 4G full band scan.

5. The method as claimed in claim 4, wherein camping the UE based on the 5G full band scan or the 4G full band scan comprises:
   determining whether at least one of a 4G cell is available based on the 4G full band scan on the list of 4G frequencies, and a 5G cell is available based on the 5G full band scan on the list of 5G frequencies; and
   performing, by the UE, at least one of:
      camping the UE on the 4G cell and terminating the 5G full band scan in response to determining that the 4G cell is available based on the 4G full band scan,
      camping the UE on the 5G cell and terminating the 4G full band scan in response to determining that the 5G cell is available based on the 5G full band scan, and camping the UE on the 5G cell and terminating the 4G full band scan in response to determining that both the 5G cell is available based on the 5G full band scan and the 4G cell is available based on the 4G full band scan.

6. The method as claimed in claim 5, wherein camping the UE on the 4G cell and terminating the 5G full band scan in response to determining that the 4G cell is available based on the 4G full band scan further comprises:
  determining, by the UE that a system information block 24 (SIB24) message includes information associated with the 5G cell;
  searching, by the UE the 5G cell for camping the UE based on the SIB24 message; and
  camping the UE, on the 5G cell found in the search.

7. The method as claimed in claim 5, wherein camping the UE on the 4G cell and terminating the 5G full band scan in response to determining that the 4G cell is available based on the 4G full band scan comprises prioritizing a 4G cell with 5GC over a 4G cell without 5GC for camping the UE.

8. The method as claimed in claim 4, wherein camping on the 4G cell without 5GC in response to determining that the 4G cell without 5GC is available for camping the UE based on the 4G MRU frequency scan further comprises:
  determining, by the UE that a SIB24 message includes information associated with the 5G cell;
  searching, by the UE the 5G cell for camping the UE based on the SIB24 message; and
  camping the UE, on the 5G cell found in the search.

9. The method as claimed in claim 1, wherein the 5G and 4G overlapping area comprises a 5G standalone area, a 5G non-standalone area and the 4G area.

10. A user equipment (UE) configured to be camped on a cell, based on the UE being present in a $5^{th}$ generation (5G) and a $4^{th}$ generation (4G) overlapping area, the UE comprising:
  a memory;
  a processor coupled to a communicator comprising communication circuitry, the processor and configured to control the UE to:
    create a combined most recently used (MRU) list by merging a list 4G MRU frequencies with a public land mobile network (PLMN) having a 5G core (5GC) and a list of 5G MRU frequencies;
    determine whether one of a 4G cell with 5GC and a 5G cell is available for camping the UE by performing a MRU scan on the combined MRU list;
  perform at least one of:
    camping the UE on one of the 4G cell with 5GC and the 5G cell in response to determining that one of the 5G cell and the 4G cell with 5GC is available for camping the UE based on the MRU scan on the combined MRU list, and
    performing a 4G MRU frequency scan on a list of 4G without 5GC MRU frequencies in response to determining that one of the 4G cell with 5GC and the 5G cell is not available for camping the UE based on the MRU scan on the combined MRU list, and camping the UE based on the 4G MRU frequency scan.

11. The UE as claimed in claim 10, wherein performing the MRU scan on the combined MRU list comprises performing a 5G MRU frequency scan on the list of 5G MRU frequencies in parallel to a 4G with 5GC MRU frequency scan on the list of 4G MRU frequencies having the 5GC.

12. The UE as claimed in claim 10, wherein performing MRU scan on the combined MRU list comprises performing a 5G MRU frequency scan on the list of 5G MRU frequencies followed by a 4G with 5GC MRU frequency scan on the list of 4G MRU frequencies having the 5GC.

13. The UE as claimed in claim 10, wherein camping the UE based on the 4G MRU frequency scan comprises:
  determining, by the UE, whether a 4G cell without 5GC is available for camping the UE by performing the 4G MRU frequency scan on the list of 4G MRU frequencies without 5GC; and
performing, by the UE, at least one of:
  camping on the 4G cell without 5GC in response to determining that the 4G cell without 5GC is available for camping the UE based on the 4G MRU frequency scan on the list of 4G MRU frequencies without 5GC; and
  performing a 5G full band scan on a list of 5G frequencies and a 4G full band scan on a list of 4G frequencies in parallel, and camping the UE based on the 5G full band scan or the 4G full band scan.

14. The UE as claimed in claim 13, wherein camping the UE based on the 5G full band scan or the 4G full band scan comprises:
  determining whether at least one of a 4G cell and a 5G cell is available based on the 4G full band scan on the list of 4G MRU frequencies, and the 5G full band scan on the list of 5G MRU frequencies; and
  performing, by the UE, at least one of:
    camping the UE on the 4G cell and terminating the the 5G full band scan in response to determining that the 4G cell is available based on the 4G full band scan,
    camping the UE on the 5G cell and terminating the the 4G full band scan in response to determining that the 5G cell is available based on the 5G full band scan, and
    camping the UE on the 5G cell and terminating the the 4G full band scan in response to determining that both the 5G cell is available based on the 5G full band scan and the 4G cell is available based on the 4G full band scan.

15. The UE as claimed in claim 14, wherein camping the UE on the 4G cell and terminating the 5G full band scan in response to determining that the 4G cell is available based on the 4G full band scan further comprises:
  determining, by the UE that a SIB24 message includes information associated with the 5G cell;
  searching, by the UE the 5G cell for camping the UE based on the SIB24 message; and
  camping the UE on the 5G cell found in the search.

* * * * *